(12) United States Patent
Cassorla

(10) Patent No.: US 7,647,596 B2
(45) Date of Patent: Jan. 12, 2010

(54) METHOD FOR SHARING A DATA STORE ACROSS EVENT MANAGEMENT FRAMEWORKS AND SYSTEM COMPRISING SAME

(75) Inventor: Jonathan Cassorla, Austin, TX (US)

(73) Assignee: Newisys, Inc., Austin, TX (US)

( * ) Notice: Subject to any disclaimer, the term of this patent is extended or adjusted under 35 U.S.C. 154(b) by 797 days.

(21) Appl. No.: 11/298,803

(22) Filed: Dec. 8, 2005

(65) Prior Publication Data

US 2007/0150905 A1   Jun. 28, 2007

(51) Int. Cl.
*G06F 3/00*   (2006.01)
*G06F 13/00*  (2006.01)
(52) U.S. Cl. ..................................... 719/318; 719/316
(58) Field of Classification Search .................. 719/313, 719/315–316, 318; 714/25, 39, 100; 709/224
See application file for complete search history.

(56) References Cited

U.S. PATENT DOCUMENTS

| | | | |
|---|---|---|---|
| 5,999,986 A * | 12/1999 | McCauley III et al. ...... | 719/310 |
| 6,557,046 B1 * | 4/2003 | McCauley, III et al. ..... | 719/318 |
| 6,748,455 B1 * | 6/2004 | Hinson et al. ................ | 719/318 |
| 6,829,770 B1 * | 12/2004 | Hinson et al. ................ | 719/318 |
| 6,938,095 B2 * | 8/2005 | Basturk et al. ............... | 709/238 |
| 7,047,295 B1 * | 5/2006 | Hirsch ......................... | 709/224 |
| 7,237,245 B2 * | 6/2007 | Hinson et al. ................ | 719/318 |
| 2005/0216576 A1 * | 9/2005 | Nastacio et al. ............. | 709/223 |

* cited by examiner

*Primary Examiner*—Hyung S Sough
*Assistant Examiner*—Qing-Yuan Wu
(74) *Attorney, Agent, or Firm*—Raymond M. Galasso; David O. Simmons; Galasso & Associates L.P.

(57) ABSTRACT

An object model comprises a plurality of event framework information objects, a shared event data store and an event managing object. Each one of the event framework information objects define event framework characteristics for a respective one of a plurality of event frameworks implemented in a server. The shared event data store includes a plurality of event information objects each defining server event information for a respective one of a plurality of unique events exhibited by the server during operation. Each one of the event information objects is at least temporarily referenced by at least one of the event framework information objects. The event managing object is configured for creating the event information objects and managing persistence of the event information objects.

20 Claims, 3 Drawing Sheets

METHOD FOR SHARING A DATA STORE ACROSS EVENT MANAGEMENT FRAMEWORKS AND SYSTEM COMPRISING SAME

FIELD OF THE DISCLOSURE

The disclosures made herein relate generally to event data store functionality in a server and, more particularly, to access and utilization of event data store information by event management frameworks within a server.

BACKGROUND

System events are instances of indications in a system that something has gone wrong, is about to go wrong, or simply a notification of an interesting event in the system. Event instances may be solicited (e.g., requested) or unsolicited (e.g., pre-configured). There are a variety of management systems that deal with system events in very different ways. Some simply log them to a file in order to preserve an archive. Others keep accurate and up to date records that help administrators identify problems related to the system with a single glance by viewing historical information.

In a conventional approach to managing system events, an administrator of a system often goes through multiple event frameworks/views in order to witness and analyze the state of the system or history of events that may have occurred. Events are defined herein to include alerts. Due to the configuration of conventional event management frameworks, the administrator often unknowingly goes through multiple event frameworks/views in order to witness such state of the system or history of events. The reason for this situation of going through multiple event frameworks/views is that each of these event frameworks typically has its own data store that is managed independently. Undesirably, these multiple event data stores increase the required storage (e.g., at least one per framework) and complexity of an entire software stack of the system. Furthermore, conventional event management frameworks implement a method of managing event data stores that require the respective event management frameworks itself to copy and/or store event information into a respective event data store (i.e., a private event data store), which is inefficient from a resource utilization standpoint and system efficiency standpoint.

System event indications are delivered by any number of event indication output means. Examples of such event indication output means include, but are not limited to, event log entries, web console queries, command line event queries, operating panel fault indicators, Simple Network management Protocol (SNMP) traps, Intelligent Platform Management Interface (IPMI) System Event Log (SEL) entries, IPMI Platform Event Trap (PET) and Simple Main Transfer Protocol (SMTP) email. Delivery via such event indication output means may be performed in any automatic (i.e., pre-configured) manner or upon request.

The various event indication output means implemented in conventional event management frameworks lead to a number of drawbacks with respect to management of system event data. One drawback is that inter-framework communication is limited such that not all system event data is accessible through each interface. Another drawback is that each interface typically has its own data store that is managed separately. Because there are separately managed data stores, the views of these data stores will be disparate and the management of these stores will be disparate.

Therefore, implementation of event management frameworks and event data stores in a manner that overcomes drawbacks associated with conventional approaches for implementing event management frameworks and event data stores would be useful and advantageous.

SUMMARY OF THE DISCLOSURE

Embodiments of the present invention provide event management frameworks with the impression that its events (i.e., system events) are housed in a private data store and that the event management framework is managing the lifetime of the events within that private data store. However, unlike conventional approaches for enabling event management frameworks to access events in a private data store, embodiments of the present invention do so without undue complexity or overhead of the actual management by the event management frameworks. More specifically, embodiments of the present invention provide a shared event data store for exclusive use by all event frameworks and provide interfaces for objects that contain event information (i.e., BasicEvent objects). These interfaces allow event frameworks to store their own private data within the BasicEvent objects for representing event data in a private format and to maintain references to the BasicEvent objects such that any event framework can affect the lifetime of such BasicEvent objects. Implementation of a shared event data store in accordance with the present invention is enabled by a software architecture that provides for forwarding of the notification of all created and all deleted events through a generic distribution system (i.e., an EventDirector object). Accordingly, the present invention advantageously overcomes one or more shortcomings associated with conventional approaches for implementing event management frameworks and event data stores in a computer system such as a server.

In one embodiment of the present invention, an object model comprises a plurality of event framework information objects, a shared event data store and an event managing object. Each one of the event framework information objects defines event framework characteristics for a respective one of a plurality of event frameworks implemented in a server. The shared event data store includes a plurality of event information objects each defining server event information for a respective one of a plurality of unique events exhibited by the server during operation. Each one of the event information objects is at least temporarily referenced by at least one of the event framework information objects. The event managing object is configured for creating the event information objects, managing persistence of the event information objects, and forwarding indications of events to the plurality of event framework information objects.

In another embodiment of the present invention, a method of enabling access to event information within a server comprises a plurality of operations. An operation is performed for maintaining a plurality of event framework information objects each defining event framework characteristics for a respective one of a plurality of event frameworks implemented in a server. An operation is performed for maintaining a shared event data store including a plurality of event information objects each defining server event information for a respective one of a plurality of unique events exhibited by the server during operation. An operation is performed for providing each one of the plurality of event frameworks with server event information exclusively from the shared event data store. The server event information for each one of the event frameworks is provided thereto dependent upon the event framework characteristics defined in a respective one of the event framework information objects.

In another embodiment of the present invention, a server comprises at least one data processing device, memory coupled to the at least one data processing device and instructions accessible from the memory and processable by the at least one data processing device. The instructions are configured for enabling the at least one data processing device to facilitate providing access to a plurality of event frameworks, maintaining a plurality of event framework information objects each defining event framework characteristics for a respective one of the event frameworks, maintaining a shared event data store including a plurality of event information objects each defining server event information for a respective one of a plurality of unique events, and providing each one of the plurality of event frameworks with server event information exclusively from the shared event data store. The server event information for each one of the event frameworks is provided thereto dependent upon the event framework characteristics defined in a respective one of the event framework information objects.

Turning now to specific aspects of the present invention, in at least one embodiment, the event management object notifies each one of the event frameworks of a current status of each one of the event information objects and the current status includes one of creation of an event information object or deletion of the event information object or enumeration of the plurality of event information objects.

In at least one embodiment of the present invention, managing persistence includes preserving presence of a particular one of the event information objects when at least one of the event framework information objects references the particular one of the event information objects and deleting the particular one of the event information objects when none of the event framework information objects reference the particular one of the event information objects.

In at least one embodiment of the present invention, each one of the event framework information objects is an interface between the event managing object and the respective one of the event frameworks.

In at least one embodiment of the present invention, each one of the event framework information objects maintains reference to a collection of the event information objects that jointly define server event information accessible through the respective one of the event frameworks.

In at least one embodiment of the present invention, each one of the event framework information objects may store framework specific information within the collection of event information objects.

In at least one embodiment of the present invention, providing each one of the plurality of event frameworks with server event information includes providing an interface between an event management object and each one of the event framework information objects.

In at least one embodiment of the present invention, the event managing object is configured for creating the event information objects, managing persistence of the event information objects and notifying each one of the event frameworks of a current status of each one of the event information objects.

In at least one embodiment of the present invention, providing each one of the plurality of event frameworks with server event information includes each one of the event framework information objects maintaining reference to a collection of the event information objects that jointly define server event information accessible through the respective one of the event frameworks.

In at least one embodiment of the present invention, maintaining the shared event data store includes each one of the event framework information objects storing framework specific information within the collection of event information objects.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
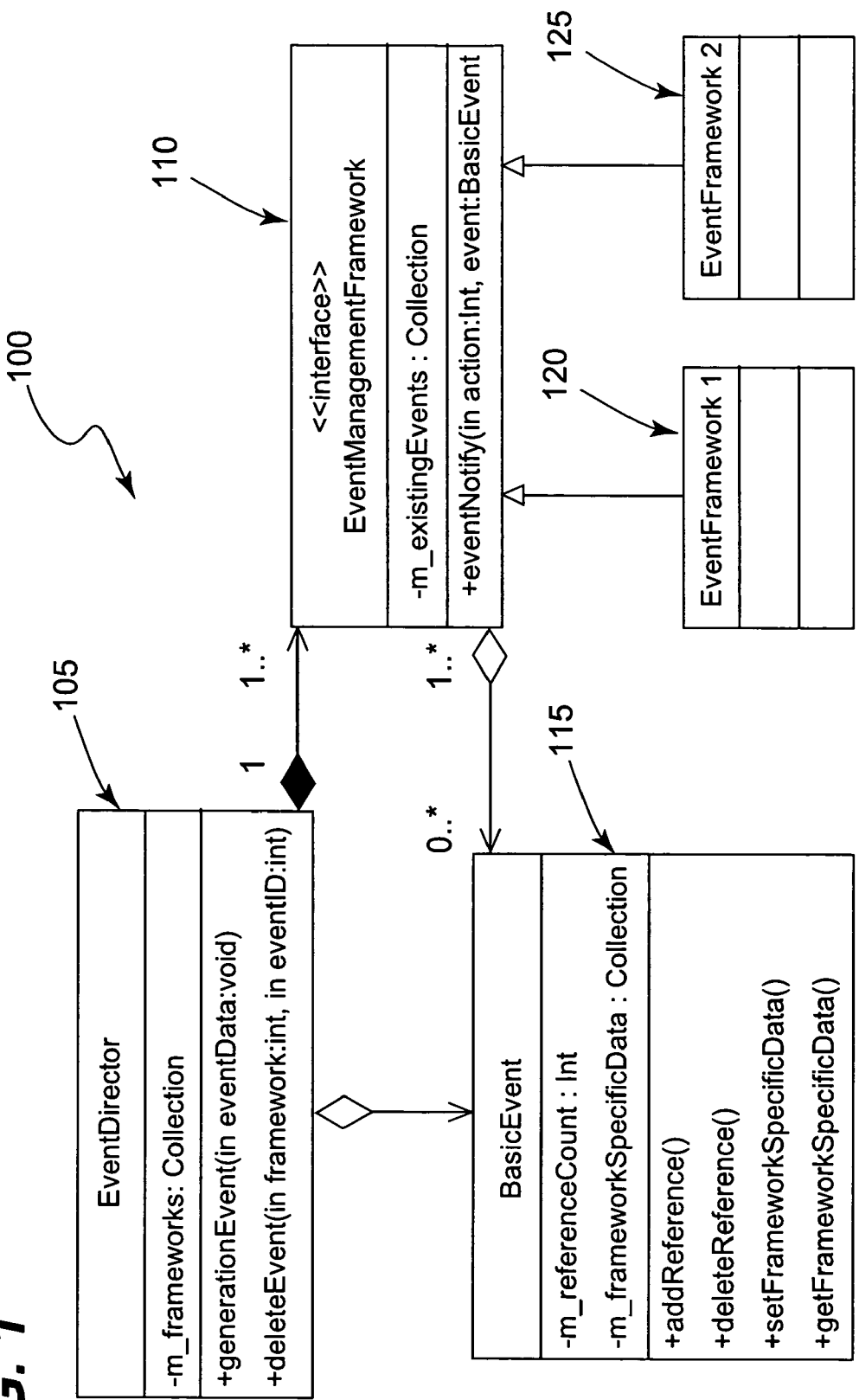
FIG. 1 is a class hierarchy diagram depicting object model architecture representing for an embodiment of a shared event data store platform in accordance with the present invention

FIG. 1 is a class hierarchy diagram depicting object model architecture representing for an embodiment of a shared event data store platform in accordance with the present invention, which is referred to herein as the shared event data store platform 100. The shared event data store platform 100 includes an EventDirector object 105, a plurality of EventManagementFramework objects 110, a plurality of BasicEvent objects 115, a first event framework 120 and a second event framework 125. The EventDirector object 105, each EventManagementFramework object 110 and each BasicEvent object 115 are created in the image of, respectively, an EventDirector object class, an EventManagementFramework object class and a BasicEvent object class.

It should be understood that usefulness of the present invention is not limited by a particular number of event frameworks. In the depicted embodiment of the shared event data store platform 100, two event frameworks (i.e., the event frameworks (120, 125)) are included. In other embodiment (not shown), a shared event data store platform in accordance with the present invention may include more than two event frameworks or less than two event frameworks.

The first event framework 120 and the second event framework 125 are illustrative examples of event frameworks implemented in service processor embedded within a server of a data processing system. As is discussed below in greater detail, the EventDirector object 105, the EventManagementFramework objects 110 and the BasicEvent objects 115 interact to provide the first event framework 120 and the second event framework 125 with the impression that their respective events are housed in private (e.g., separate) data store and that they are individually managing the lifetime of the event within their respective private data store. Advantageously, the shared event data store platform 100 provides such functionality with reduced complexity and overhead with respect to conventional approaches for implementing event management frameworks as it makes the data store management as simple as managing a reference to an object.

The EventDirector object 105 is an agnostic object model component that, in effect, is the entry point to the shared event data store platform 100 for information from event generators and other system components. The EventDirector object 105 provides functionality that includes receiving information from event generators (e.g., new events, deleted events, etc), understanding which event management frameworks are configured for interaction with the shared event data store platform 100, acting as the proxy agent for notifying all such configured frameworks of the creation and deletion of events, and managing a shared event data store consisting of the plurality of BasicEvent objects 115 that exclusively serves all of the configured frameworks. More specifically, a shared event data store in accordance with the present invention includes a plurality of BasicEvent objects 115 each defining server event information for a respective one of a plurality of unique events (e.g., events occurring at different times, events having different parameters, etc) and event information is provided to each one of the EventManagementFramework objects 110 exclusively from the shared event data store. This shared event data store is advantageous in that it is an underlying aspect of the shared event data store platform 100 that enables event data to be exclusively provided to each one of the event frameworks (120, 125) in a manner as if shared event data store were the event framework's own private and/or custom-configured data store.

The EventDirector object 105, which is an embodiment of an event managing object in accordance with the present invention, is the object that all event generators in a system ultimately interact with in order to propagate events to all configured event management frameworks. With respect to managing the contents of the shared event data store, the EventDirector object 105 has a number of responsibilities once it has been notified of a new event by an event generator. One responsibility is to create an instance of an object instantiated from the BasicEvent object class (i.e., a new BasicEvent object) that represents the event data and notifying each of the EventManagementFramework objects 110 of existence of this new BasicEvent object to. Another responsibility is to manage the persistence of the BasicEvent objects that make up the shared event data store.

Each one of the EventManagementFramework objects 110 is an abstract object that defines specific characteristics of a respective event framework—in essence, what the respective event framework looks like. Each one of the EventManagementFramework objects 110 are an embodiment of an event framework information object in accordance with the present invention. The event frameworks (120, 125) each maintain a respective collection of events, references to all or a portion of the BasicEvent objects 115 and how the BasicEvent objects 115 each map to specific events accessible via the event framework (120, 125). In response to actions forwarded to a particular one of the EventManagementFramework objects 110 by the EventDirector object 105, a derivation of that particular one of the EventManagementFramework objects 110 will interact with its respective event subsystem and take appropriate action, such as generating asynchronous indications, creating event log entries, or removing them. Accordingly, the EventManagementFramework objects 110 each have a number of related responsibilities. One responsibility is providing an interface enabling specifics of an event management subsystem represented by a corresponding one of the EventManagementFramework objects 110 to be accessed. Another responsibility is creating and removing references to appropriate ones of the BasicEvent objects 115 that each one of the EventManagementFramework objects 110 has a need or desire to represent within the respective one of the event frameworks (120, 125). In doing so, a particular one of the BasicEvent objects 115 may be deleted once none of the configured frameworks (i.e., the first and second frameworks (120, 125)) make reference to that particular one of the BasicEvent objects 115. Still another responsibility is storing all appropriate framework specific information within referenced ones of the BasicEvent objects 115 so that events are able to be presented and/or manipulated by a corresponding one of the event frameworks (120, 125) in accordance with such framework specific information.

Each one of the BasicEvent objects 115 is an embodiment of an event information object in accordance with the present invention and corresponds to a respective event exhibited within the system in which the shared event data store platform 100 is implemented. Examples of such events, include, but are not limited to, exceeding an operating condition, setting an alarm, implementation of a diagnostic activity and the like. Each one of the BasicEvent objects 115 contains all of the information required for enabling interfacing of the shared event data store with an event framework to be carried out by the EventManagementFramework objects 110. Additionally, each one of the BasicEvent objects 115 provides a respective interface that allows the first and second event frameworks (120, 125) to store their own specific data within the BasicEvent objects 115 to which they refer. A BasicEvent has a reference count associated with it, which determines its lifetime. Any event framework wishing to keep track of this event must maintain a reference to the object. Once the reference count reaches zero, the EventDirector destroys the object.

Figure 2:
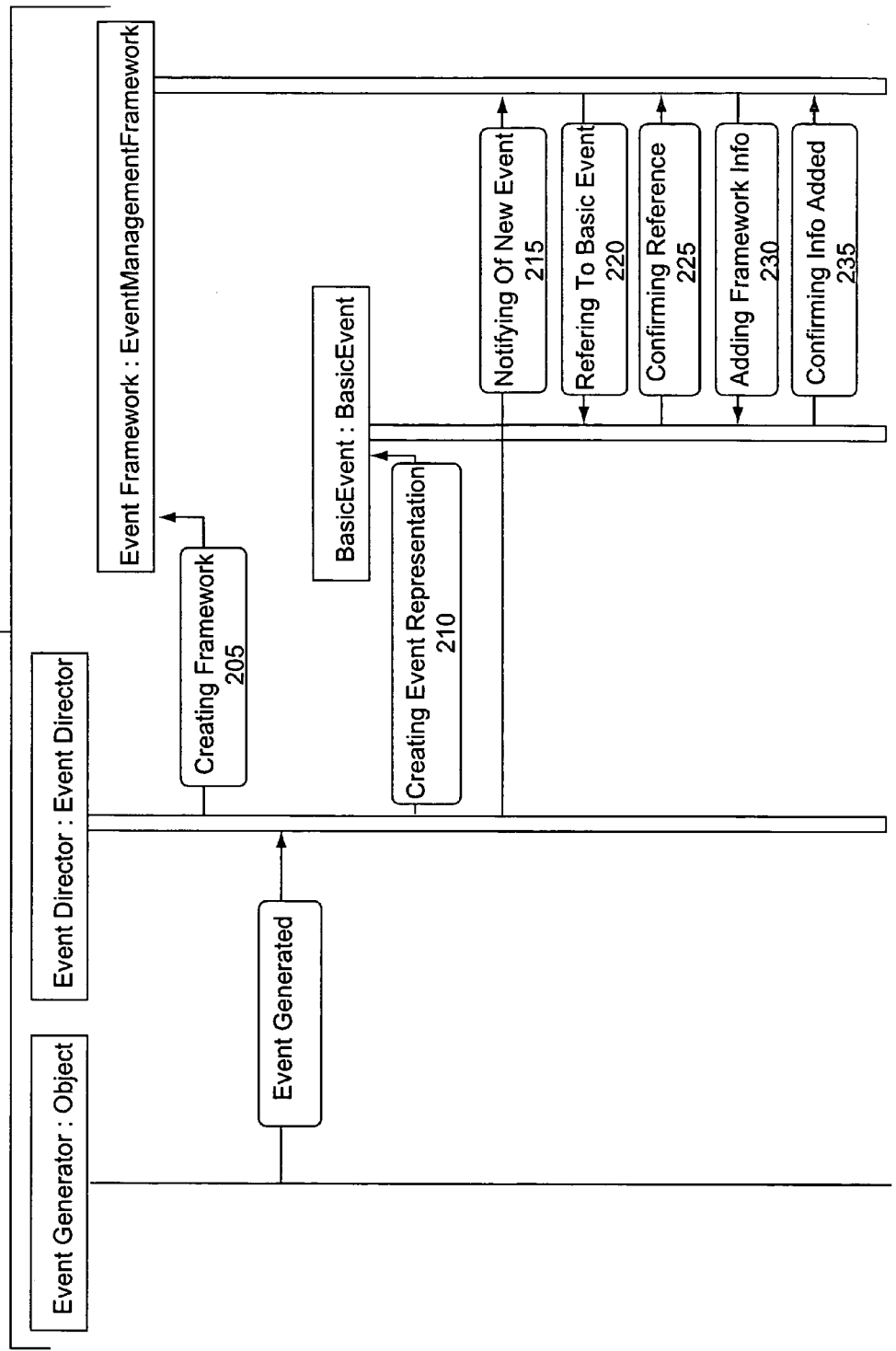
FIG. 2 is a sequence diagram depicting an embodiment of a method for enabling an event framework in a system to access event information from a shared event data store in accordance with the present invention.

FIG. 2 is a sequence diagram depicting an embodiment of a method for enabling an event framework in a system to access event information from a shared event data store in accordance with the present invention. The method depicted in FIG. 2 is referred to herein as the method 200. The object model architecture of the shared event data store platform 100 depicted in FIG. 1 is an example of an object model architecture suitably configured for carrying out the method 200. However, in view of the disclosures made herein, a skilled person will appreciate that enabling an event framework in a system to access event information from an event data store in accordance with the present invention may be implemented using an object model architecture different than the object model for the shared event data store platform 100 depicted in FIG. 1. It will also be appreciated with a plurality of event frameworks may be served by the method 200.

The method 200 begins with an EventDirector object in accordance with the present invention performing an operation 205 for creating an instance of an EventManagementFramework object representing the event framework in the system (i.e., object instruction "constructor"). After creating the instance of the EventManagementFramework object and in response to receiving notification from an event generator that an event has been generated, the EventDirector object performs an operation 210 for creating an instance of a BasicEvent object corresponding to the event (i.e., object instruction "constructor"). Accordingly, the BasicEvent object contains information representing the event. Also after creating the instance of the BasicEvent object, the EventDirector object performs an operation 215 for notifying the EventManagementFramework object of the existence of the new event (i.e., object instruction "eventNotify(EVENT_Generate; BasicEvent&)").

In response to being notified of existence of the new event, the EventManagementFramework object performs an operation 220 for creating a reference to the BasicEvent object (i.e., object instruction "addReference( )"). Preferably, but not necessarily, creating the reference to the BasicEvent object includes causing a reference value of the BasicEvent object to increment by 1. In doing so, the BasicEvent object persists so long as the reference value is at least one. In response to the reference to the BasicEvent object being created, the BasicEvent object performs an operation 225, the BasicEvent performs operation 225 by confirming with the EventManagementFramework object that the reference has been added to the BasicEvent object. Also in response to being notified of existence of the new event, the EventManagementFramework object performs an operation 230 for adding framework specific information to the BasicEvent object (i.e., object instruction "setFrameworkSpecificData( )"). As discussed above, providing framework specific information within the BasicEvent object advantageously allows the event to be presented and/or manipulated by the event framework dependent upon such framework specific information. In response to the framework specific information being added, the BasicEvent object performs an operation 235 for confirming with the EventManagementFramework object that the framework specific information has been added to the BasicEvent object.

Figure 3:
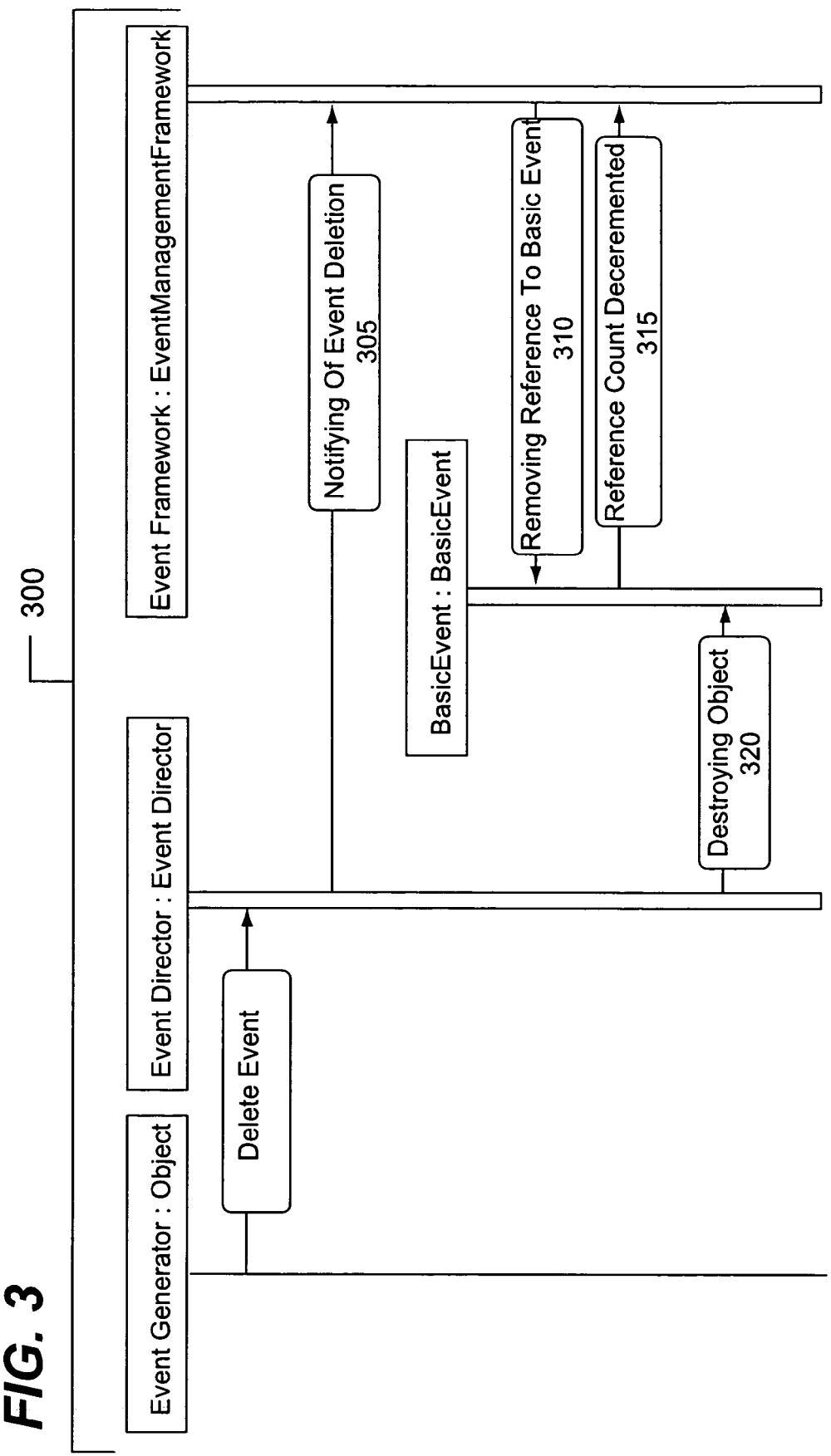
FIG. 3 is a sequence diagram depicting an embodiment of a method for destroying a BasicEvent object in accordance with the present invention.

FIG. 3 is a sequence diagram depicting an embodiment of a method for destroying a BasicEvent object in accordance with the present invention. The method depicted in FIG. 2 is referred to herein as the method 300. The object model architecture of the shared event data store platform 100 depicted in FIG. 1 is an example of an object model architecture suitably configured for carrying out the method 300. However, in view of the disclosures made herein, a skilled person will appreciate that destroying a BasicEvent object in accordance with the present invention may be implemented using an object model architecture different than the object model for the shared event data store platform 100 depicted in FIG. 1. It will also be appreciated with a plurality of event frameworks may be served by the method 300.

The method 300 begins with an EventDirector object in accordance with the present invention performing an operation 305 for notifying the EventManagementFramework object that the event corresponding a BasicEvent object has been deleted (i.e., object instruction "eventNotify(EVENT_Deleted,Basic Event&)") in response to receiving notification from an event generator (or EventManagementFramework object) that such event has been deleted. In response to the EventManagementFramework object being notified that the event corresponding a BasicEvent object has been deleted, the EventManagementFramework object performs an operation 310 for removing reference of the EventManagementFramework object to the BasicEvent object (i.e., object instruction "deleteReference( )"). Thereafter, the BasicEvent object performs an operation 315 for confirming with the EventManagementFramework object that reference of the EventManagementFramework object to the BasicEvent object has been removed.

Preferably, but not necessarily, removing reference to the BasicEvent object includes causing a reference value of the BasicEvent object to decrement by 1. In doing so, the BasicEvent object persists so long as the reference value is at least one. In the case where decrementing the reference value of the BasicEvent object by 1 causes the reference value of the BasicEvent object to become 0, the Event Director performs an operation 320 for facilitating destruction of the BasicEvent object.

Referring now to computer readable medium, it will be understood from the inventive disclosures made herein that methods, processes and/or operations adapted for enabling functionality of a shared event data store platform in accordance with the present invention are tangibly embodied by computer readable medium having instructions thereon for carrying out such functionality. In one specific embodiment, the instructions are tangibly embodied for carrying out the method 200 for enabling an event framework in a system to access event information from a shared event data store and/or the method 300 for destroying a BasicEvent object. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the inventive disclosures made herein include a compact disk, a hard drive, RAM or other type of storage apparatus that has imaged thereon a computer program (i.e., a set of instructions) adapted for carrying out functionality of a shared event data store platform in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A computer readable medium having instructions provided thereon for processing data, such that the instructions, when carried out by at least one data processing device, enable said at least one data processing device to perform the steps comprising:

maintaining a plurality of event framework information objects each defining event framework characteristics for a respective one of a plurality of event frameworks implemented in a computer system, wherein said event framework characteristics define a manner in which computer system event information derived from operating conditions of the computer system is at least one of presented by the respective one of said event frameworks and manipulated by the respective one of said event frameworks;

maintaining a shared event data store including a plurality of event information objects each defining computer system event information for a respective one of a plurality of unique operating condition-based events exhibited by the computer system during operation, wherein each one of said event information objects is at least temporarily referenced by at least one of said event framework information objects; and maintaining an event managing object configured for creating said event information objects and managing persistence of said event information objects.

2. The computer-readable medium of claim 1 wherein:

the event management object notifies each one of said event frameworks of a current status of each one of said event information objects; and the current status includes one of creation of an event information object and deletion of the event information object.

3. The computer-readable medium of claim 1 wherein said managing persistence includes:
- preserving presence of a particular one of said event information objects when at least one of said event framework information objects references the particular one of said event information objects; and
- deleting the particular one of said event information objects when none of said event framework information objects reference the particular one of said event information objects.

4. The computer-readable medium of claim 1 wherein each one of said event framework information objects is an interface between the event managing object and the respective one of said event frameworks.

5. The computer-readable medium of claim 1 wherein each one of said event framework information objects maintains reference to a collection of said event information objects that jointly define computer system event information accessible through the respective one of said event frameworks.

6. The computer-readable medium of claim 5 wherein each one of said event framework information objects stores framework specific information within said collection of event information objects.

7. The computer-readable medium of claim 6 wherein:
- the event management object notifies each one of said event frameworks of a current status of each one of said event information objects; and
- the current status includes one of creation of an event information object and deletion of the event information object.

8. The computer-readable medium of claim 6 wherein said managing persistence includes:
- preserving presence of a particular one of said event information objects when at least one of said event framework information objects references the particular one of said event information objects; and
- deleting the particular one of said event information objects when none of said event framework information objects reference the particular one of said event information objects.

9. A method of enabling access to event information within a server, comprising:
- maintaining a plurality of event framework information objects each defining event framework characteristics for a respective one of a plurality of event frameworks implemented in a server, wherein said event framework characteristics define a manner in which server event information derived from operating conditions of the server is at least one of presented by the respective one of said event frameworks and manipulated by the respective one of said event frameworks;
- maintaining a shared event data store including a plurality of event information objects each defining server event information for a respective one of a plurality of unique operating condition-based events exhibited by the server during operation; and
- providing each one of the plurality of event frameworks with server event information exclusively from the shared event data store, wherein said server event information for each one of said event frameworks is provided thereto dependent upon said event framework characteristics defined in a respective one of said event framework information objects.

10. The method of claim 9, further comprising:
- notifying each one of said event frameworks of a current status of each one of said event information objects, wherein said notifying is performed by an event management object and wherein the current status includes one of creation of an event information object and deletion of the event information object.

11. The method of claim 9 wherein said maintaining the shared event data store includes:
- preserving presence of a particular one of said event information objects when at least one of said event framework information objects references the particular one of said event information objects; and
- deleting the particular one of said event information objects when none of said event framework information objects reference the particular one of said event information objects.

12. The method of claim 9 wherein:
- said providing each one of the plurality of event frameworks with server event information includes providing an interface between an event management object and each one of said event framework information objects; and
- the event managing object is configured for creating said event information objects, managing persistence of said event information objects and notifying each one of said event frameworks of a current status of each one of said event information objects.

13. The method of claim 9 wherein said providing each one of the plurality of event frameworks with server event information includes each one of said event framework information objects maintaining reference to a collection of said event information objects that jointly define server event information accessible through the respective one of said event frameworks.

14. The method of claim 13 wherein said maintaining the shared event data store includes each one of said event framework information objects storing framework specific information within said collection of event information objects.

15. A server, comprising:
- at least one data processing device;
- memory coupled to said at least one data processing device; and
- instructions accessible from said memory and processable by said at least one data processing device, wherein said instructions are configured for enabling said at least one data processing device to facilitate:
- providing access to a plurality of event frameworks;
- maintaining a plurality of event framework information objects each defining event framework characteristics for a respective one of said event frameworks, wherein said event framework characteristics define a manner in which server event information derived from operating conditions of the server is at least one of presented by the respective one of said event frameworks and manipulated by the respective one of said event frameworks;
- maintaining a shared event data store including a plurality of event information objects each defining server event information for a respective one of a plurality of unique operating condition-based events exhibited by the server during operation; and
- providing each one of the plurality of event frameworks with server event information exclusively from the shared event data store, wherein said server event information for each one of said event frameworks is provided thereto dependent upon said event framework characteristics defined in a respective one of said event framework information objects.

16. The server of claim 15 wherein:
- said instructions are further configured for enabling said at least one data processing device to facilitate notifying each one of said event frameworks of a current status of each one of said event information objects;

wherein said notifying is performed by an event management object; and wherein the current status includes one of creation of an event information object and deletion of the event information object.

17. The server of claim 15 wherein said maintaining the shared event data store includes:

preserving presence of a particular one of said event information objects when at least one of said event framework information objects references the particular one of said event information objects; and deleting the particular one of said event information objects when none of said event framework information objects reference the particular one of said event information objects.

18. The server of claim 15 wherein:

said providing each one of the plurality of event frameworks with server event information includes providing an interface between an event management object and each one of said event framework information objects; and the event managing object is configured for creating said event information objects, managing persistence of said event information objects and notifying each one of said event frameworks of a current status of each one of said event information objects.

19. The server of claim 15 wherein said providing each one of the plurality of event frameworks with server event information includes each one of said event framework information objects maintaining reference to a collection of said event information objects that jointly define server event information accessible through the respective one of said event frameworks.

20. The server of claim 19 wherein said maintaining the shared event data store includes each one of said event framework information objects storing framework specific information within said collection of event information objects.

* * * * *